United States Patent [19]
Su et al.

[11] Patent Number: 5,882,698
[45] Date of Patent: Mar. 16, 1999

[54] LENS MOLD FOR USE IN A CONTACT LENS INSPECTION APPARATUS

[75] Inventors: Kai C. Su; Jack C. White, both of Alpharetta; Mushir Siddiqui, Lawrenceville, all of Ga.

[73] Assignee: CIBA Geigy Corporation, Ardsley, N.Y.

[21] Appl. No.: 700,849

[22] Filed: Aug. 21, 1996

Related U.S. Application Data

[60] Division of Ser. No. 459,772, Jun. 2, 1995, Pat. No. 5,574,554, which is a continuation-in-part of Ser. No. 89,523, Jul. 21, 1993, abandoned.

[51] Int. Cl.$^6$ ........................................................ B29D 11/00
[52] U.S. Cl. .......................... 425/215; 249/117; 249/160; 425/412; 425/808
[58] Field of Search ..................... 249/117, 160; 425/215, 412, 808; 264/2.3

[56] References Cited

U.S. PATENT DOCUMENTS

| | | |
|---|---|---|
| 4,121,896 | 10/1978 | Shepherd . |
| 4,150,073 | 4/1979 | Neefe . |
| 4,159,292 | 6/1979 | Neefe . |
| 4,166,088 | 8/1979 | Neefe . |
| 4,197,266 | 4/1980 | Clark et al. . |
| 4,208,364 | 6/1980 | Shepherd . |
| 4,209,289 | 6/1980 | Newcomb et al. . |
| 4,229,390 | 10/1980 | Neefe . |
| 4,284,399 | 8/1981 | Newcomb et al. . |
| 4,285,890 | 8/1981 | Mizutani et al. . |
| 4,347,198 | 8/1982 | Ohkada et al. . |
| 4,379,510 | 4/1983 | Ziegel . |
| 4,469,646 | 9/1984 | Rawlings . |
| 4,684,014 | 8/1987 | Davenport . |
| 4,782,946 | 11/1988 | Pollak . |
| 5,036,971 | 8/1991 | Seden et al. . |
| 5,160,749 | 11/1992 | Fogarty . |
| 5,271,875 | 12/1993 | Appleton et al. . |
| 5,355,213 | 10/1994 | Dotan . |
| 5,395,558 | 3/1995 | Tsai . |
| 5,461,570 | 10/1995 | Wang et al. . |

FOREIGN PATENT DOCUMENTS

| | | |
|---|---|---|
| 2057832 | 6/1992 | Canada . |
| 087179 | 8/1983 | European Pat. Off. . |
| 0367513 | 5/1990 | European Pat. Off. . |
| 0604179 | 6/1994 | European Pat. Off. . |
| 604174 | 6/1994 | European Pat. Off. . |
| 0605171 | 7/1994 | European Pat. Off. . |
| 0605990 | 7/1994 | European Pat. Off. . |
| 0607692 | 7/1994 | European Pat. Off. . |
| 0685734 | 12/1995 | European Pat. Off. . |
| 0686459 | 12/1995 | European Pat. Off. . |
| 0686841 | 12/1995 | European Pat. Off. . |
| 0686842 | 12/1995 | European Pat. Off. . |
| 0691273 | 1/1996 | European Pat. Off. . |
| 1362588 | 4/1964 | France . |
| 3444532 | 6/1986 | Germany . |
| WO9304848 | 3/1993 | WIPO . |

OTHER PUBLICATIONS

Patent Abstracts of Japan, vol. 8, No. 139 (E–253)(1576) 28 Jun. 1984 (JP 59–50534).

*Primary Examiner*—James P. Mackey
*Attorney, Agent, or Firm*—Wenderoth, Lind & Ponack, L.L.P.

[57] ABSTRACT

Collimated white light is transmitted through a transparent lens mold having a molded lens resting on a curved surface thereof. A telecentric lens and a camera having a digital output are used to view the illuminated lens to obtain pixel image data of the lens. The pixel image data is analyzed by a computer to detect deformities in the molded lens.

22 Claims, 17 Drawing Sheets

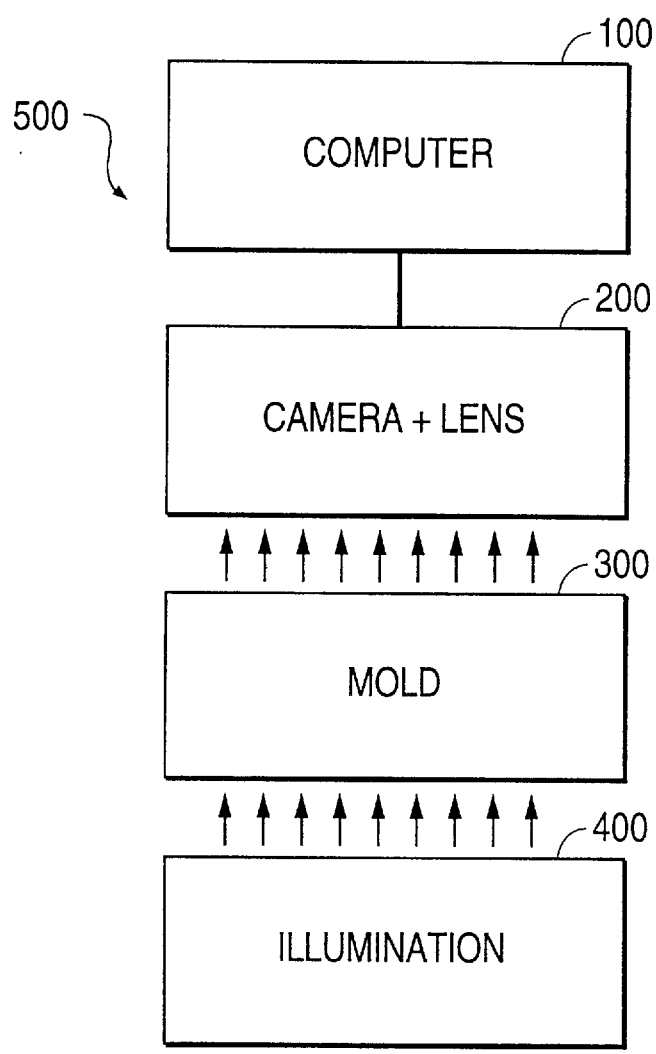

TO CAMERA LENS

FROM LIGHT SOURCE

LENS MOLD FOR USE IN A CONTACT LENS INSPECTION APPARATUS

CROSS-REFERENCE TO RELATED APPLICATIONS

This is a Divisional application of application Ser. No. 08/459,772, filed Jun. 2, 1995, and now U.S. Pat. No. 5,574,554, is a Continuation-In-Part of application Ser. No. 08/089,523, filed Jul. 21, 1993, entitled "TWO-SIDED CONTACT LENS MOLD" and now abandoned.

BACKGROUND OF THE INVENTION

1. Field of the Invention.

The present invention relates to the manufacture of contact lenses, and more particularly, to a method and apparatus for molding, automatically inspecting and packaging contact lenses; and to a contact lens mold used in such a method and apparatus.

2. Description of the Related Art.

Conventionally, a soft contact lens is molded using a two-sided mold in which one side of the mold includes a convex surface and the other side of the mold includes an opposing concave surface, and in which a cavity for forming the lens is defined by the opposing convex and concave surfaces. A lens is formed by placing a lens material on one of the convex and concave surfaces, bringing the two sides of the mold together to form the lens cavity and separating the two sides of the mold to expose the cast lens after polymerization of the lens material.

Furthermore, techniques are generally known for controlling the adhesion of the molded lens upon separation of the two sides of the mold, i.e., for causing the molded lens to exhibit an affinity to adhere to one of the convex and concave surfaces upon separation of the two sides of the mold. The utilization of such techniques helps eliminate the time consuming, manual labor that is otherwise required in determining which surface the transparent molded lens has adhered to after separation of the two sides of the mold. For example, European Patent Application Publication No. 0367513 discloses a technique for ensuring that the molded lens remains in contact with one side of the mold by flame polishing the convex surface of the one side of the mold. Furthermore, U.S. Pat. No. 4,197,266 discloses that by fabricating the two sides of the mold with materials which, while both wettable, have different degrees of wettability, one can insure that the molded lens will adhere to the desired surface of the mold upon separation. Additionally, U.S. Pat. No. 4,150,073 discloses that the adhesion of the molded lens may be controlled by exposing a mold surface to monomeric vapors.

However, conventional techniques for making contact lenses suffer various drawbacks.

For example, in manufacturing the contact lens, lens material of a sufficient quantity to exceed the volume of the cavity is placed on one of the mold surfaces, and then the two sides to the mold are brought together to form the lens cavity. The quantity of excess lens material is collected within the mold body, along the outer periphery of the lens cavity, to form a ring of excess polymerized lens material. Conventionally, upon separation of the lens mold, this ring of excess lens material is located by visual inspection and then removed manually.

Furthermore, after the lens has been molded and the mold separated, testing of certain physical characteristics of the molded lens must be carried out. Conventionally, each individual molded lens is manually removed from the mold, and placed on a test tray. Light is then transmitted through the lens and directed into a screen where certain deformities in the lens may be visually detected. Still further, additional manual handling of each lens is necessary to place the lens in a lens package containing, for example, saline solution.

In general, the manufacture of contact lenses is conventionally labor intensive, requiring manual handling and visual inspection of the cast lens during several stages of production, and further requiring manual removal of the ring of excess lens material.

SUMMARY OF THE INVENTION

A general object of the present invention is to reduce the manual labor expended in the manufacture of contact lenses.

A more specific object of the present invention is to provide a method and apparatus for the automated inspection of contact lenses.

Another more specific object of the present invention is to provide a contact lens mold in which optical inspection of a lens may be carried out while the lens remains disposed in the mold surface of the contact lens mold.

The above and other objects of the present invention are realized by the provision of an automated inspection system including a device for illuminating the lens to be inspected, a lens and camera for receiving an image of the illuminated lens to be inspected, and a computer for analyzing the image obtained by the camera to determine an acceptability of the lens to be inspected.

The above and other objects of the present invention are further realized by forming one side of the mold of a relatively transparent material and by providing an optical finish on a bottom surface thereof. Optical inspection of a lens may then be carried out by transmitting light through the one side of the mold and through the lens disposed on the one side of the mold. Alternately, the mold may be formed of an opaque plastic material whereby light is made to reflect off the inner surface of the opaque plastic material and through the lens disposed on the inner surface.

The above and other objects of the present invention are further realized by configuring one side of the mold such that the ring of excess lens material is mechanically locked to the one side of the mold upon polymerization of the lens material.

BRIEF DESCRIPTION OF THE DRAWINGS

The aspects and features of the present invention will become more apparent from the following description taken in conjunction with the drawings in which:

FIG. 1 is a block diagram showing an overall system for molding and inspecting contact lenses according to the present invention;

DETAILED DESCRIPTION OF THE PREFERRED EMBODIMENT

Figure 2A:
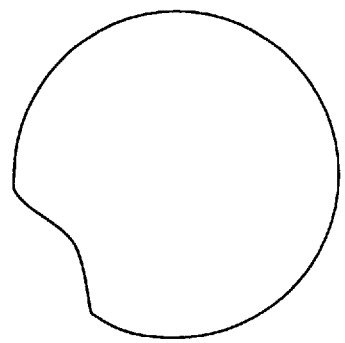
FIGS. 2(a)–2(d) show examples of defective lenses.

The contact lens molding and inspection system 500 of the present invention is made up of four subsystems a shown in FIG. 1, i.e., a computer subsystem 100, a camera and lens subsystem 200, a mold subsystem 300 and an illumination subsystem 400. Each of the subsystems is discussed individually below, and then a description is made of the operation of the overall system 500.

1. The Computer Subsystem 100

The present inventors have employed, as the computer subsystem 100, the AUTOVISION 100 Vision System manufactured by Automatix Incorporated of Billerica, Mass. The AUTOVISION 100 is a high-resolution, gray scale machine vision system for effecting image processing and analysis in various industrial applications. The computer subsystem 100 may, of course, be realized using other off-the-shelf vision systems available on the market or by using in-house configured computer devices.

Figure 2B:
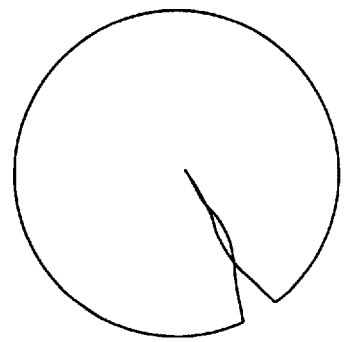
Figure 2C:
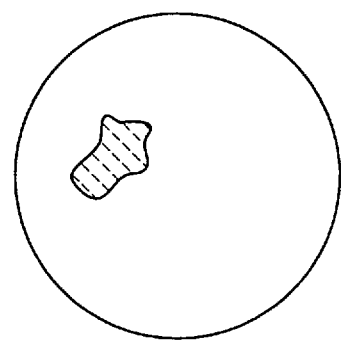

The software of the AUTOVISION 100 VISION SYSTEM is designed to process and analyze image data received from the camera lens subsystem 200. In the case of the present inventors, Automatic Incorporated was retained to develop a program according to the designed specifications of the inventors, and in particular, a program capable of automatically distinguishing between acceptable and non-acceptable lenses based on the image data received from the camera lens subsystem 200. In particular, Automatix Incorporated developed mathematical algorithms and incorporated the algorithms into the software of the AUTOVISION 100 for detecting defects in the lens image. The is accomplished by counting dark and light pixels and using standard imaging techniques in order to correlate defects. Referring to FIGS. 2(a) through 2(c), examples of the types of defects detected by the AUTOVISION 100 program are shown.

Figure 2D:
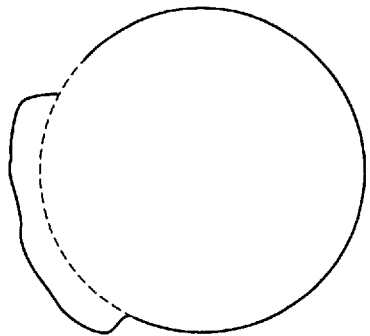

In particular, FIG. 2(a) shows a lens 1 having a defective edge, and similarly, FIG. 2(b) shows a lens 1 having a tear at its edge. FIG. 2(c) shows a lens 1 having a defect such as an air bubble, a rough surface region or a foreign particle in the optical area thereof. FIG. 2(d) shows a lens having flash. Thus, edge image processing, as well as surface image processing, of the lens image is effected. As mentioned above, in the case of the present inventors, a third party was employed to develop the algorithm and programs needed to detect the abnormalities in the image data of the lenses. However, the necessary algorithms and programming can be developed in house using known imaging techniques, if desired.

In short, the computer subsystem 100 is obtained by programming a standard industrial vision system for the purpose of analyzing imaging data, such as gray-scale pixel image data, to detect lens abnormalities. The particular industrial vision system used and the types of mathematical algorithms employed are a matter of user preference.

2. The Camera and Lens Subsystem 200

Figure 3:
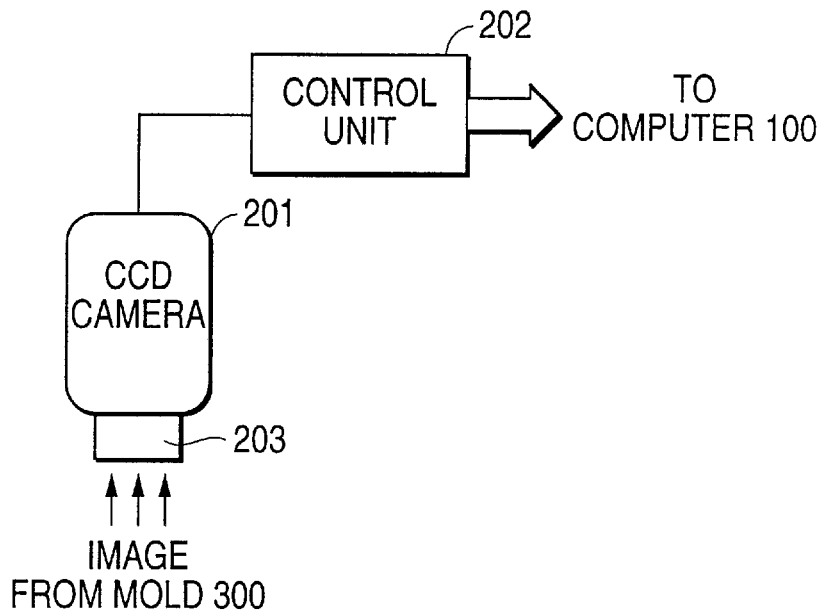
FIG. 3 is a diagram depicting a camera and lens subsystem.

Referring to FIG. 3, the camera and lens subsystem 200 is used to view a lens contained within the mold subsystem 300 and to generate corresponding image information to be applied to and processed by the computer subsystem 100. In the case of the present inventors, a Kodak MEGAPLUS MODEL 1.4 CLASS III camera 201 having a CCD array and Kodak MEGAPLUS Control Unit 202 were employed. In general, this camera system generates an 8 bit, 256 gradations digital output for each of 1,035 vertical pixels and 1,317 horizontal pixels of a rectangular image frame, each pixel being 6.8 microns square.

The lens 203 used with the Kodak MEGAPLUS camera was a MELLES GRIOT Invaritar Over-Telecentric Gaging Lens System manufactured by Melles Griot Incorporated, of Rochester, N.Y. The viewing angle (telecentricity) of this particular lens is constant within 0.5° for a ⅔ inch CCD array camera and 0.4° for a ½ inch camera. While not a requirement, such over-telecentricity was found to be particularly important with respect to optical detection of the edge of the inspected lens.

In short, the camera and lens subsystem 200 may be realized by a high-resolution camera having a digital gray-scale pixel output, and by using preferably an over-telecentric lens.

3. The Mold Subsystem 300

Figure 4:
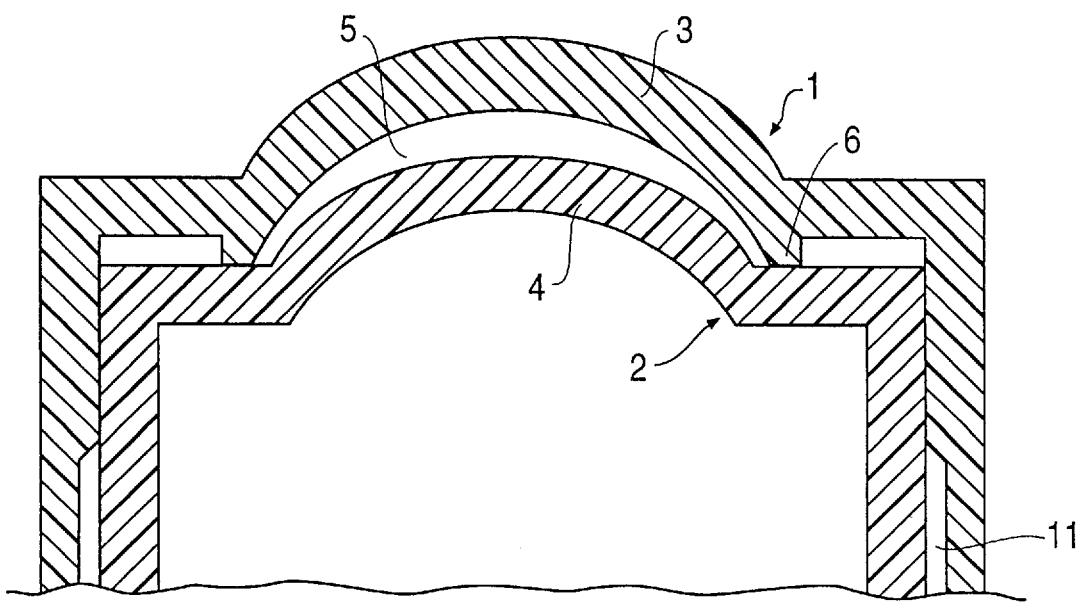
FIG. 4 is a cross-sectional view generally showing a contact lens mold.

As generally shown in FIG. 4, the mold subsystem 300 of the present invention includes a first mold member 1 having a concave surface portion 3, and a second mold member 2 having a convex surface portion 4. A cavity 5 for forming the lens is provided when the outer rim 6 of the concave surface portion 3 is made to contact the convex surface portion 4 as shown. Such contact is achieved by engagement (such as by friction fitting members 11 or by mechanical clamping) of the first and second mold members 1, 2. The surfaces of the lens are thus formed in conformity with the respective surfaces of the convex and concave portions 3, 4, and are specified in advance to comply with optical requirements. The first and second mold members 1, 2 may be formed by known techniques, such as by injection molding.

There are two aspects of the mold subsystem 300 to be noted. First, either one of the first mold member 1 or the second mold member 2 is configured to allow for optical inspection of a lens resting thereon. Second, the first and second mold members 1 and 2 are also configured to control adhesion of both the molded lens and a ring of excess material. Each of these aspects of the mold subsystem 300 is discussed below.

a. Optical Properties

As with the conventional lens mold, the lens mold of the present invention includes optically finished concave and convex surfaces defining the lens cavity. For example, referring to FIG. 5 which depicts the mold member 2 after a lens 7 has been molded and the mold member 1 has been detached and discarded, the mold member 2 containing the convex surface portion 4 includes a convex surface 4a having an optical finish.

Figure 5:
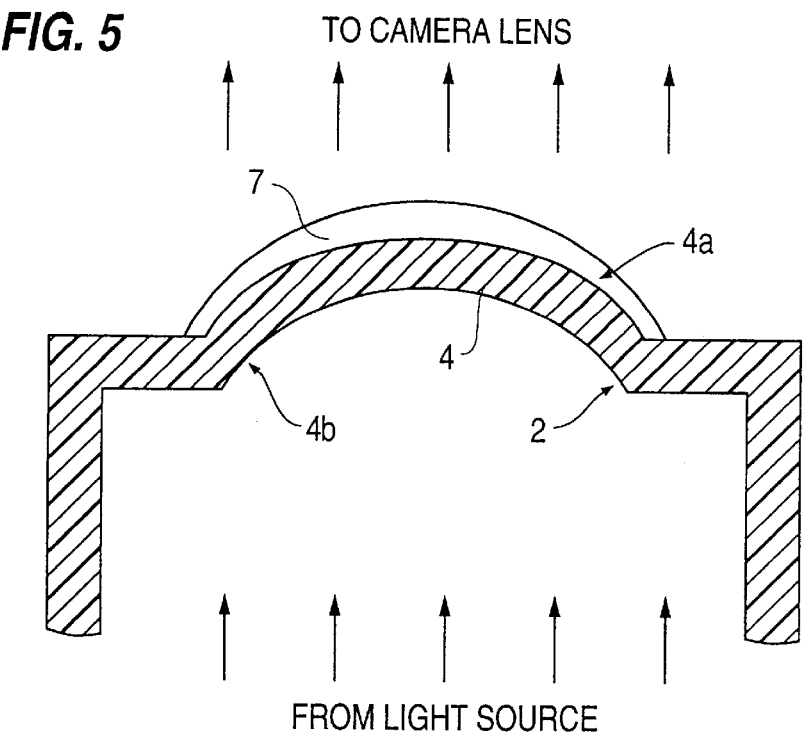
FIG. 5 is a cross-sectional view showing a mold member having a molded lens resting thereon.

Also, according to the present invention, the lens mold member 2 is transparent and includes an additional optically finished curved surface 4b opposite the surface 4a. In particular, as shown in FIG. 5, an optically finished concave surface 4b is located opposite the optically finished convex surface 4a to permit light to be accurately transmitted through the convex surface portion 4 to the lens 7 resting on the convex surface 4a.

An additional aspect of the optical properties of the lens mold according to the present invention will now be discussed with reference also to FIGS. 6(a) to 6(d).

Figure 6A:
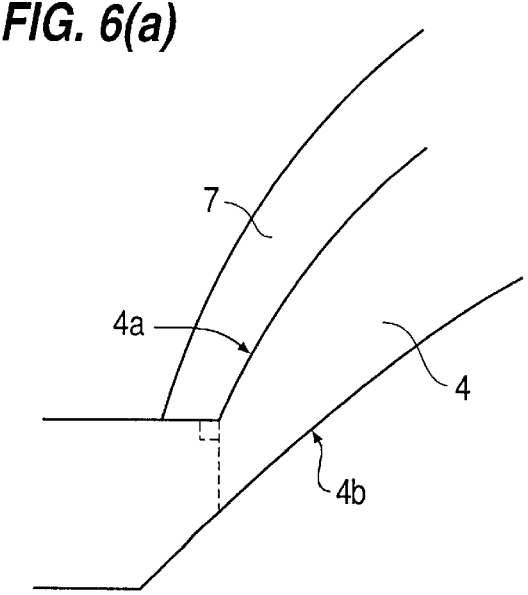
FIGS. 6(a)–6(d) are view for explaining a configuration along a periphery of mold optical surfaces.

Initially, the present inventors believed that the most favorable image of the lens would be obtained by aligning the outer periphery of the optical surface 4a outside the outer periphery of the optical surface 4(b) as shown in FIG. 6(a). The inventors felt that such alignment would minimize the effects of the mold corner located along the outer periphery of the optical surface 4b. However, the inventors discovered that the image was in fact improved by displacing the outer periphery of the surface 4b inward a distance "d" relative to the outer periphery of the surface 4a as shown in FIG. 6(c).

Figure 6B:
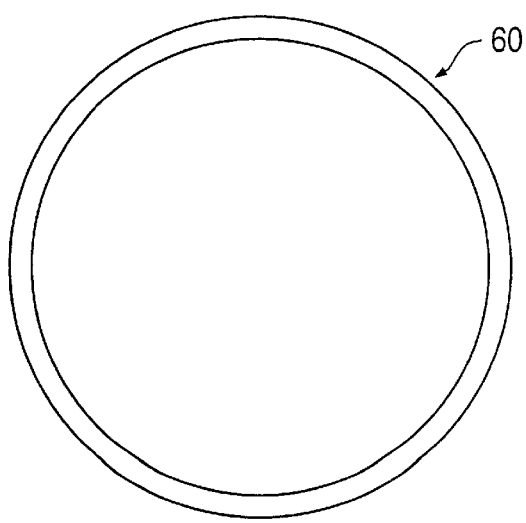
Figure 6C:
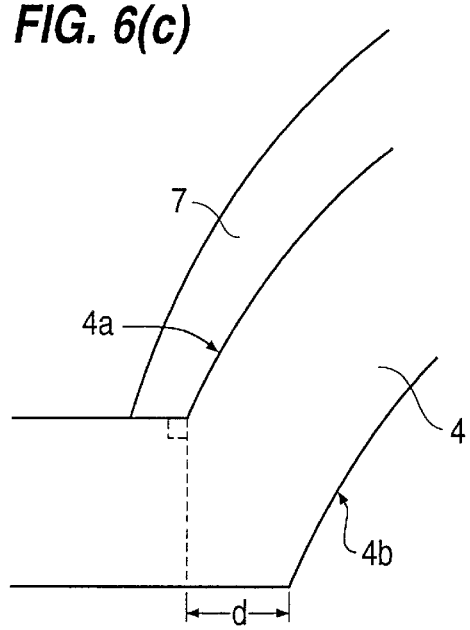
Figure 6D:
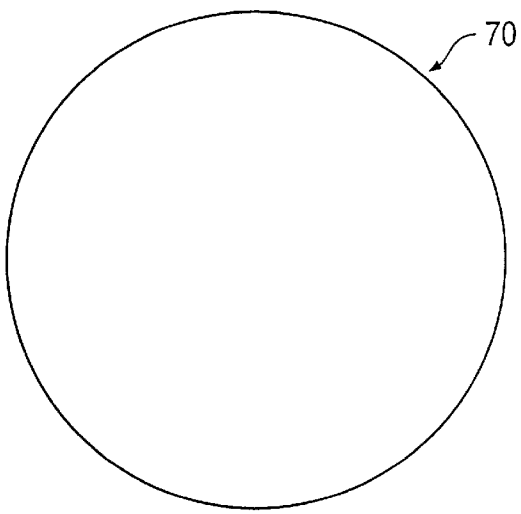

More particularly, when the peripheries of the surfaces 4a and 4b are substantially aligned, an image 60 as generally illustrated in FIG. 6(b) was obtained in which the edge region of the lens appeared dark. In contrast, when the periphery of the surface 4b is displaced inwardly of the periphery of the surface 4a, an image 70 as generally shown in FIG. 6(d) was obtained in which the edge of the lens is well defined. The amount of displacement "d", as well as the curvature of the surface 4b, to obtain the best image may be determined by trial and error, or may be calculated depending upon mold curvature, index of refraction, etc., as discussed below.

Figure 7:
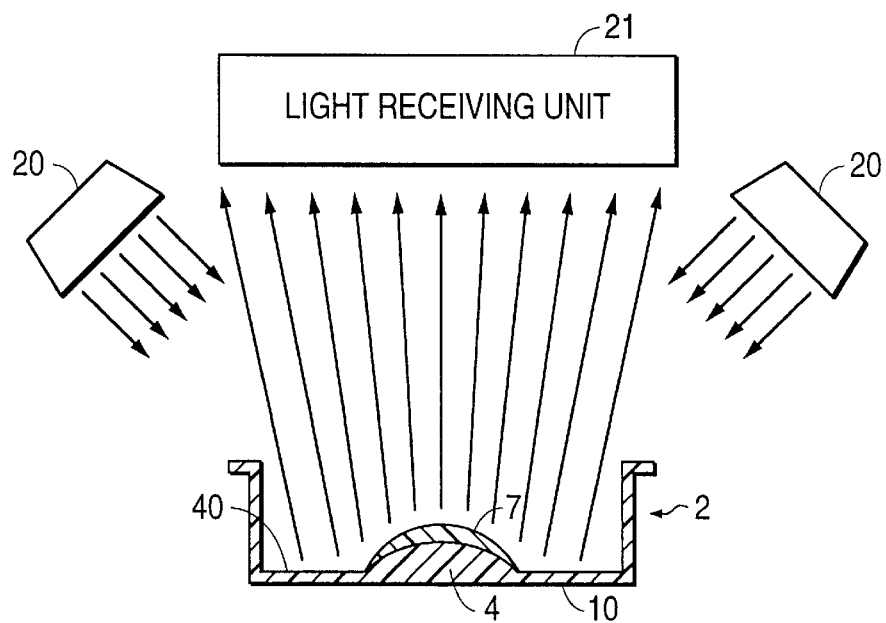
FIG. 7 is a view for explaining the use of a mold having an opaque optical finish.

A contemplated alternative to the above arrangement is shown in FIG. 7, in which the second mold member 2 is formed of a relatively opaque plastic and upper surface 40 thereof, including the convex surface, is provided with a reflective optical finish. The thus formed second mold member 2 may be placed in relation to the light source 20 and the light receiving unit 21 such that light is reflected off of the upper surface 4 and through the molded lens 7 to the light receiving unit 21 to thereby obtain an image of the molded lens 7.

As is known to those skilled in the art, the tooling members for forming the lens mold are provided with an optical finish, by polishing for example, only at surface portions thereof which conform to the lens defining surfaces of the lens mold. In the same manner, the optical finishes discussed above with respect to FIGS. 5–7 may be obtained.

Furthermore, a spin cast method of manufacturing contact lenses is known in the art whereby only one mold member is utilized. Briefly, in such a method, a single mold member is provided with a quantity of lens material on a concave surface thereof and is then rotated, whereby centrifugal forces act on the lens material to form a contact lens. The aspect and advantages of the present invention are discussed with respect to FIGS. 5–7, which are equally applicable to such a mold member used in the spin cast technique.

Reference is now made to FIGS. 19–26 and the following discussion directed to design of the lens mold on which a lens to be inspected is resting.

Figure 19:
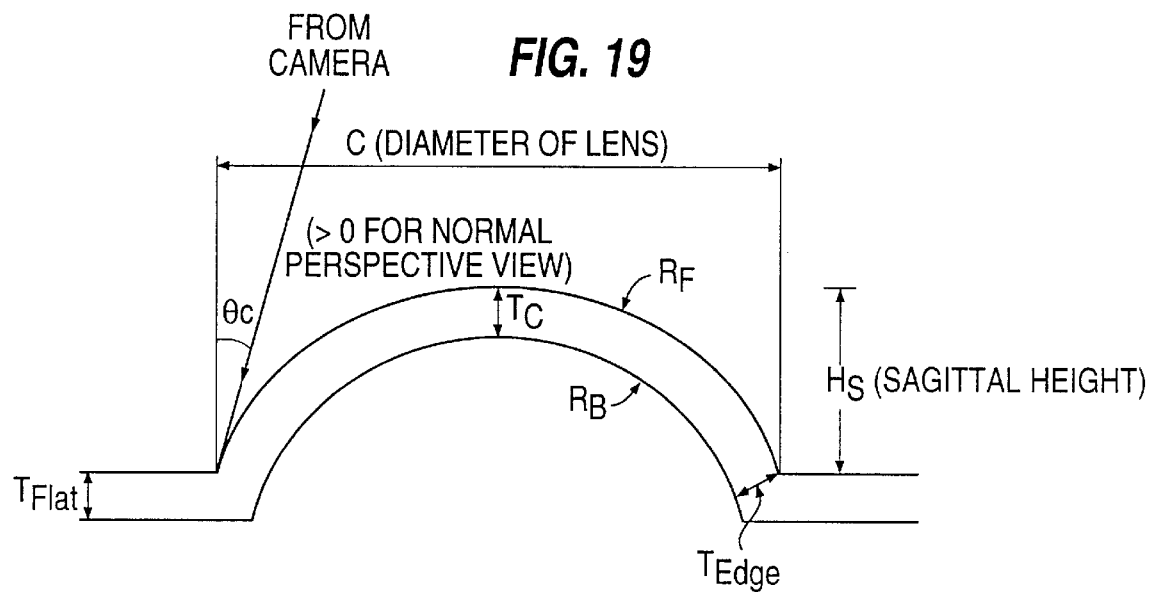
FIGS. 19–28 are various views for explaining the design of a lens mold configuration.

A first step is to set given parameters and to calculate other parameters from the given parameters. Referring to FIG. 19, given any two of the front surface radius $R_F$, the chord diameter C and the sagittal height $H_S$, the remaining third parameter can be calculated from the following equations:

$$H_S = R_F - \frac{1}{2}\sqrt{4F_R^2 - C^2}$$

$$C = 2\sqrt{H_S(2R_F - H_S)}$$

$$R_F = \frac{H_S}{2} + \frac{C^2}{8H_S}$$

Then, given any one of the inner radius $R_B$ and the dome thickness $T_C$, the remaining parameter can be calculated as follows:

$$R_F - R_B = T_C$$

$$R_B = R_F - T_C$$

Figure 20:
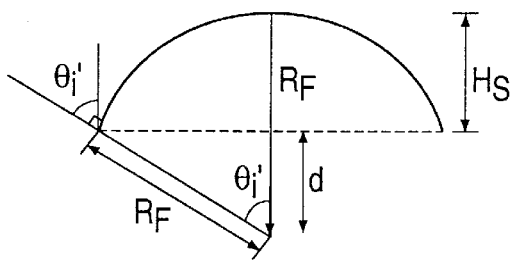
Figure 21:
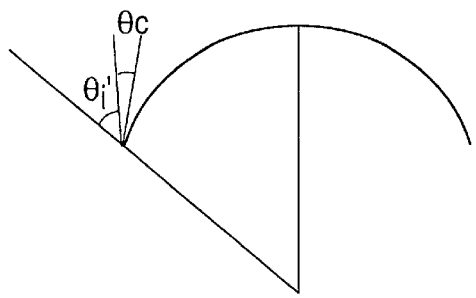

Referring the FIGS. 20 and 21, a next step is to calculate an angle of incidence $\theta_i$ using the following formula:

$$\theta_i = \theta'_i + \theta_C = \arccos\left[1 - \frac{H_X}{R_F}\right] + \theta_C$$

Figure 22:
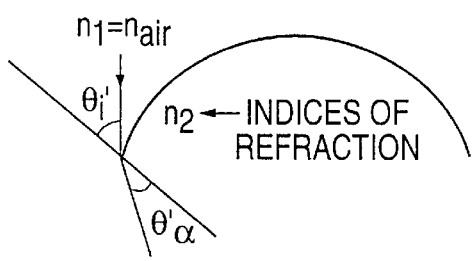

Referring to FIG. 22, a next step is to determine a raw critical angle $\theta_{CR}'$ (angle inside mode) using indices of refraction as follows:

$$\theta'_{CR} = \arcsin\left[\frac{n_1}{n_2}\sin\theta_i\right]$$

From $\theta_{CR}'$, a safe critical angle $\theta_{CR}$ is determined from $\theta_{CR} = \theta_{CR}' = \theta_S$, where $\theta_S$ is a critical angle for safety of approximate 0.5 degrees. Then, using $\theta_{CR}$, a determination can be made as to whether there is total internal reflection. That is, light from below will be unable to escape up to the camera if the following is satisfied:

$$\theta_{CR} \geq \arcsin\frac{n_1}{n_2}$$

Figure 23:
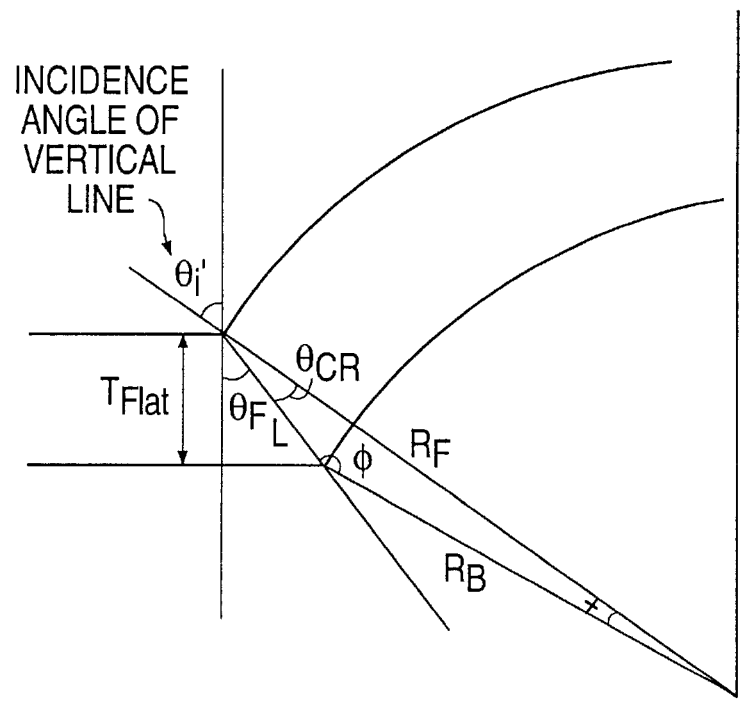
Figure 24:
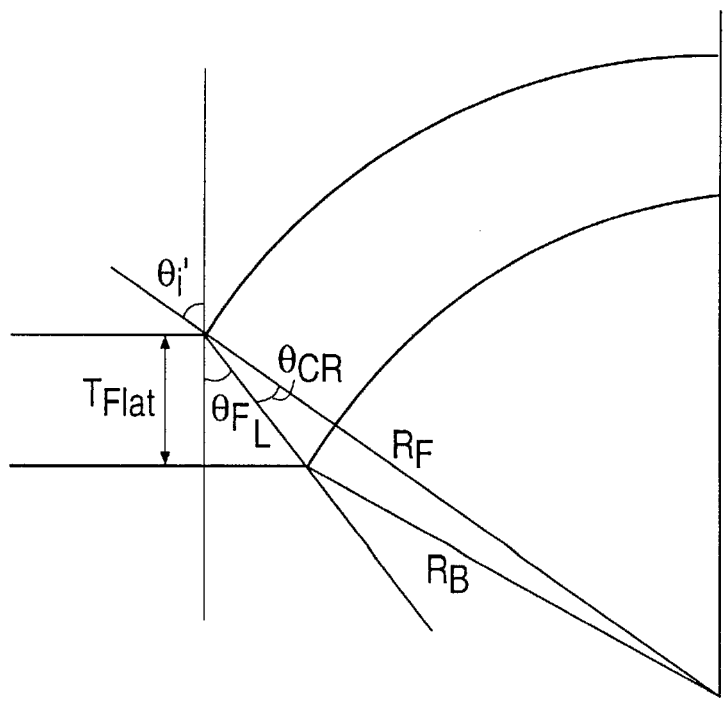
Figure 25:
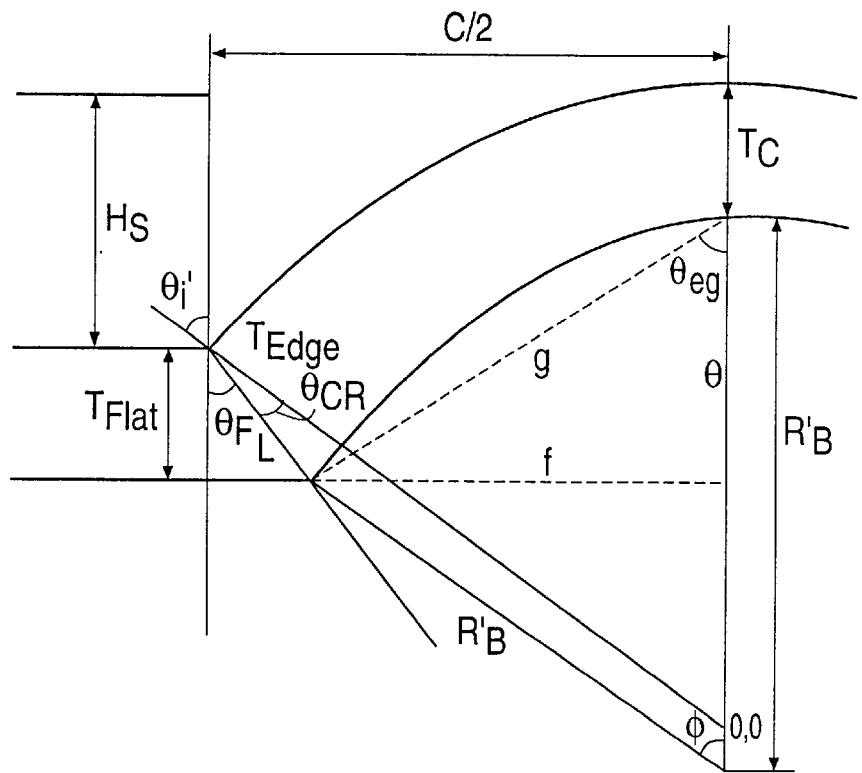
Figure 26:
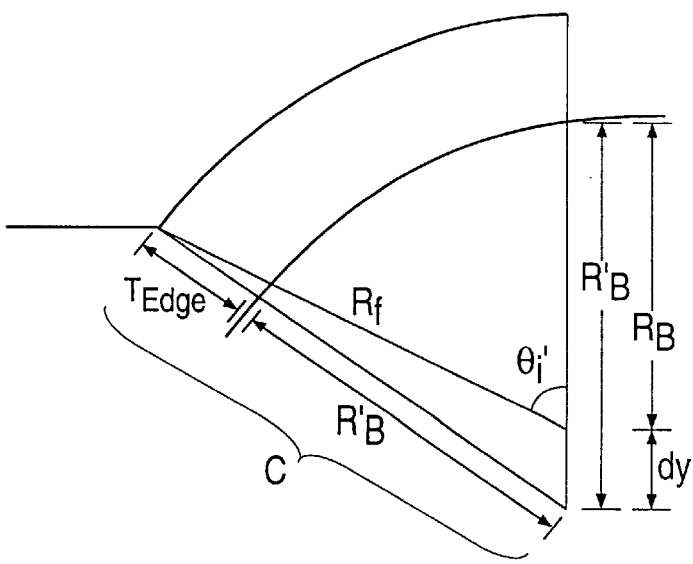

A next step is to solve for changing $T_{Flat}$ and changing $R_B$ as follows:

FIG. 23—solve for changing $T_{Flat}$ (to put back plug corner at edge of zone). $R_B$ does not change.

(law of sines): $\sin\frac{\theta_{CR}}{R_B} = \sin\frac{\theta}{R_F} \rightarrow \theta = PI - \arcsin\left(\frac{R_F}{R_B}\sin\theta_{CR}\right)$ (laws of triangles): $\theta_{CR} + \phi + x = 180° \rightarrow x = PI - \theta_{CR} - \phi$ (Law of sines): $\frac{\sin\theta_{CR}}{R_B} = \frac{\sin x}{L} \rightarrow L = R_B\frac{\sin x}{\sin\theta_{CR}}$ $\theta'_i = \theta_F + \theta_{CR} \rightarrow \theta_F = \theta'_i - \theta_{CR}$ $T_{Flat} - L\cos\theta_F$ FIG. 24—solve for changing $R_B$ (maintain constant dome thickness). $T_{Flat}$ does not change.

$\theta'_i = \theta_F + \theta_{CR} \rightarrow \theta_F = \theta'_i - \theta_{CR}$ $T_{Flat} = L\cos\theta_F \rightarrow L = \frac{T_{Flat}}{\cos\theta_F}$ (Law of cosines): $(c^2 = a^2 + b^2 - 2ab\cos\theta)$ $R_B^2 = R_F^2 + L^2 - 2RL_F L\cos\theta_{CR}$ $LR_B = \sqrt{R_F^2 + L^2 - 2R_F L\cos\theta_{CR}}$ FIGS. 25 and 26—solve for changing $R_B$ and varying dome thickness (center of new back pluq different than location of center for front cut). $T_{Flat}$ does not change.

$$\theta_F = \theta'_i - \theta_{CR}$$

$$L = \frac{T_{Flat}}{\cos\theta_F}$$

$$e = H_s + T_{Flat} - T_c$$

$$f = \frac{C}{2} - L\sin\theta_F \text{ or } = \frac{C}{2} - T_{Flat}\tan\theta_L$$

$$g = \sqrt{E^2 + F^2}$$

$$\theta_{eg} = a\tan\frac{f}{e}$$

(isoceles triangle $R'_B, R'_B, g$) $\phi = (PI) - 2\theta_{eg}$ (law of sines): $\sin\dfrac{\theta_{eg}}{R'_B} = \dfrac{\sin\phi}{g}$ $$R'_B = g\frac{\sin\theta_{eg}}{\sin(PI - 2\theta_{eg})}$$

Calculate $T_{Edge}$ for new geometry $$dy = R_B' - R_B$$

(law of cosines)

$$C^2 = R_f^2 + dy^2 - 2R_f\,dy\,\cos(PI - \theta_i')$$

$$C = R_B' = T_{Edge}$$

$$T_{Edge} = C - R_B'$$

Figure 27:
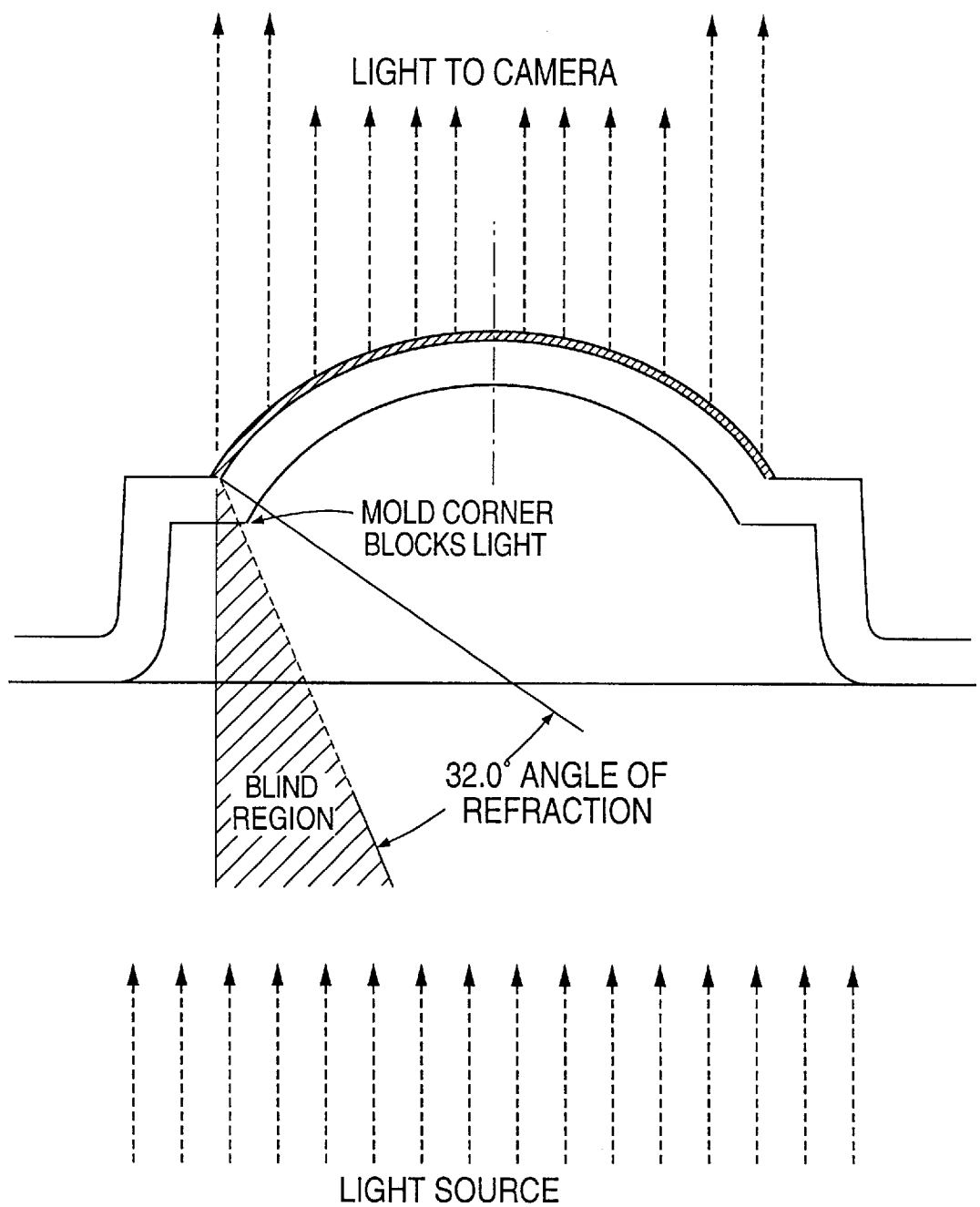
Figure 28:
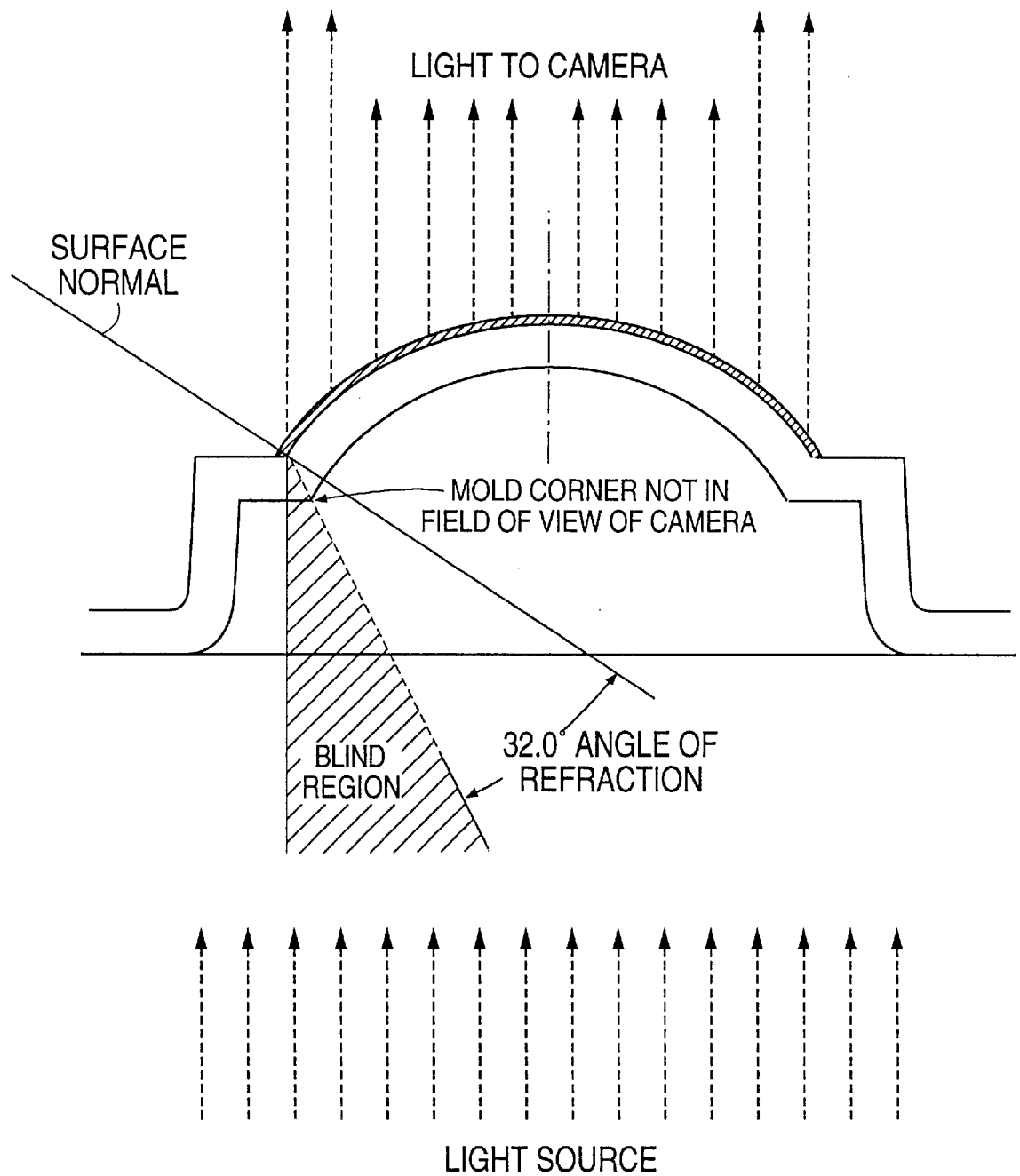

Using the equations described above with reference to FIGS. 19–26, the mold can be designed to avoid the situation illustrated in FIGS. 27 in which the mold corner blocks light. That is, with a properly designed mold, the mold corner will not appear in the field of view of the camera as shown in FIG. 28.

b. Lens Material Adhesion Properties

As suggested previously, the first and second mold members 1, 2 may be designed to control which of the mold members 1 and 2 the molded lens will tend to adhere to, and to control which of mold members 1 and 2 the excess lens material will tend to adhere to.

For example, the first and second mold members 1, 2 may optionally be formed of different plastic materials having different degrees of wettability. That is, for example, the first mold member 2 may be made from relatively polar plastic materials, and the second mold member 2 may be made from relatively non-polar plastic materials. Alternatively, the first mold member 1 may be made from relatively non-polar plastic materials, and the second mold member 2 may be made from relatively polar plastic materials.

Examples of relatively polar plastic materials include polymethylmethacrylate, polyvinylchloride, polycarbonate, polyamide, polyurethane, polyester, polysulfone, polystyrene, polyphenyleneoxide, etc., or co-polymers, or blends of like materials.

Examples of relatively non-polar plastic materials includes polypropylene, polyethylene, poly[methylpentene]; etc., co-polymers, or blends of like materials.

Accordingly, as those skilled in the art will appreciate, by the proper selection of the lens material and the polar and non-polar plastic materials of the first and second mold members 1, 2, the lens may be directed to adhere to the desired surface (concave or convex) of the two-sided mold upon separation of the first and second mold members 1, 2.

Additionally, as those skilled in the art will further appreciate, the relative polarity of the plastic mold materials selected will depend on the polarity of the lens material itself. Moreover, the degree of polarity of each plastic mold material is dependent upon the amount or number of polar groups that may occur in the polymer backbone or side chains. Therefore, two different mold materials having different relative polarities may be selected from the "relatively polar material" listed above for respectively forming the mold members 1, 2 to achieve the same desired effect. Similarly, two different mold materials may instead be selected from the "relatively non-polar materials" listed above.

Figure 8:
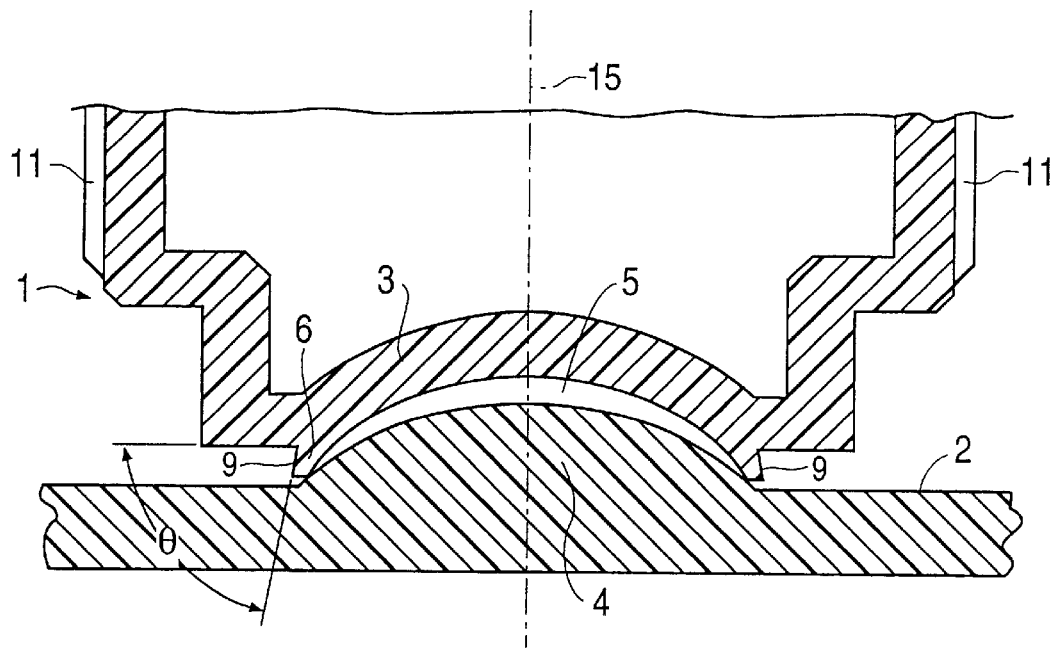
FIG. 8 is a sectional view of a two-sided lens mold according to one embodiment of the present invention.

As shown in FIG. 8, according to another aspect of the present invention, the first mold member 1 is provided with an annular surface 9 extending upwardly and inwardly (i.e., $\Theta$ is less than 90°) towards a longitudinal axis 15 from the outer rim 6 of the concave surface portion 3. That is, if the annular surface 9 tapers inwardly at a constant angle as shown, the annular surface 9 is frusto-conical.

Figure 9A:
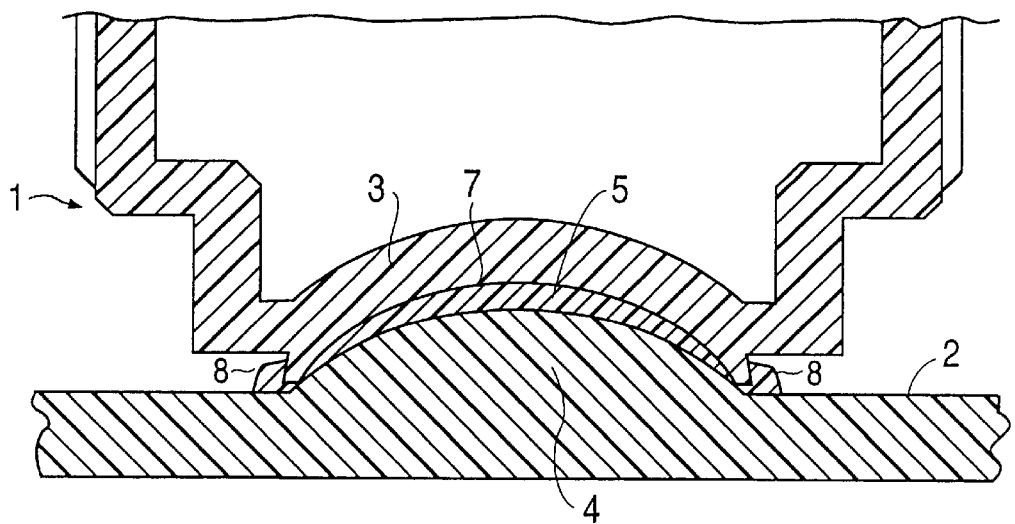
FIGS. 9(a)–9(b) are sectional views for explaining the mechanical engagement of excess lens material to the two-sided lens mold of the present invention.

The engagement of excess lens material according to the present invention will now be described with reference to FIGS. 9(a) and 9(b).

During the manufacture of the contact lens, lens material of a sufficient quantity to exceed the volume defined by the cavity 5 is placed on the concave surface portion 3 or the convex surface portion 4. The first mold member 1 is moved relative the second mold member 2 to form the cavity 5. The quantity of lens material in excess of the volume defined by the cavity 5 is collected along the outer periphery of the cavity 5 in the form of a ring 8. suppose, as described above, that the lens material and the plastic materials of the first and second members 1, 2 shown in FIG. 9(a) are selected such that the lens 7 is directed to adhere to the convex surface portion 4 of the second mold member 2.

Figure 9B:
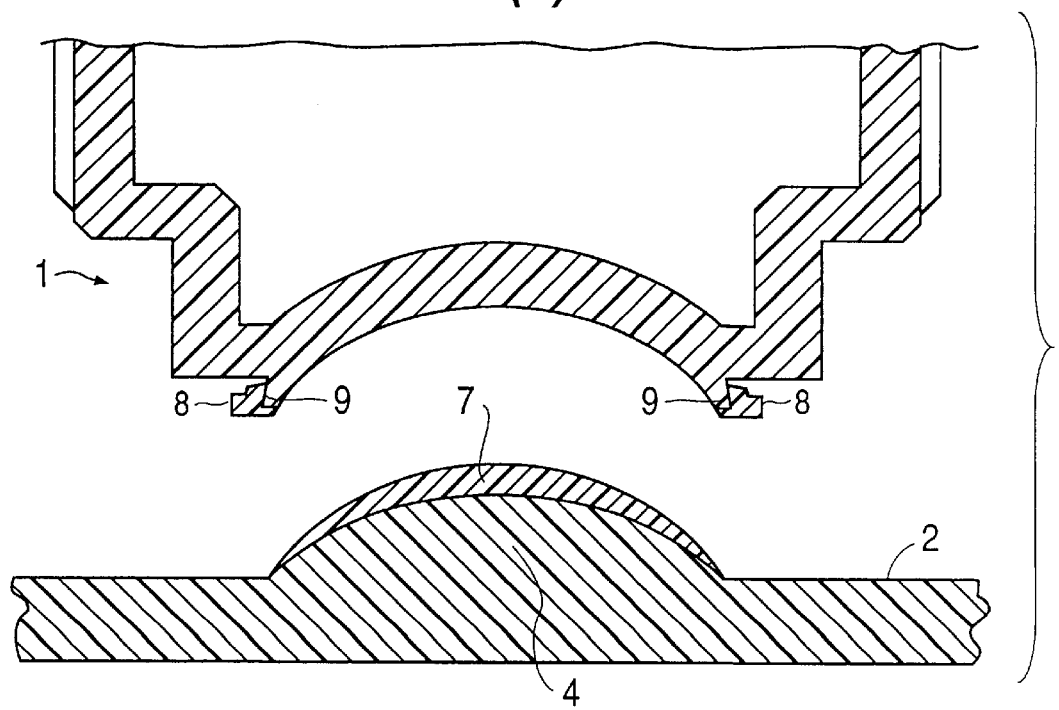

Upon polymerization of the lens material, the first and second mold members 1, 2 are separated to expose the cast lens 7 as shown in FIG. 9(b). The cast lens 7 adheres to the convex surface portion 4 due to the selection of the lens material and the relatively non-polar and polar plastic materials of the first and second mold members 1, 2. For the same reasons that the lens 7 tends to adhere to the second mold member 2, the ring 8 of excess lens material will also tend to adhere to the second mold member 2. However, the ring 8 of excess lens material is mechanically engaged with the first mold member 2 due to the inwardly extending annular surface 9. It is noted that the angle e of the inwardly extending annular surface 9 may extend only very slightly inwardly to operate as intended.

Accordingly, upon separation of the first and second mold members 1, 2, the first mold member 1 having the ring 8 of excess lens material engaged therewith may be discarded, and the second mold member 2 having the cast lens 7 adhered to the convex surface portion 4 may be conveyed to further processing steps without individual handling of the cast lens itself and without inspection and removal of the ring 8 of excess lens material.

Other embodiments of the ring engaging mechanism of the present invention will now be described with reference to FIGS. 10–14.

Figure 10:
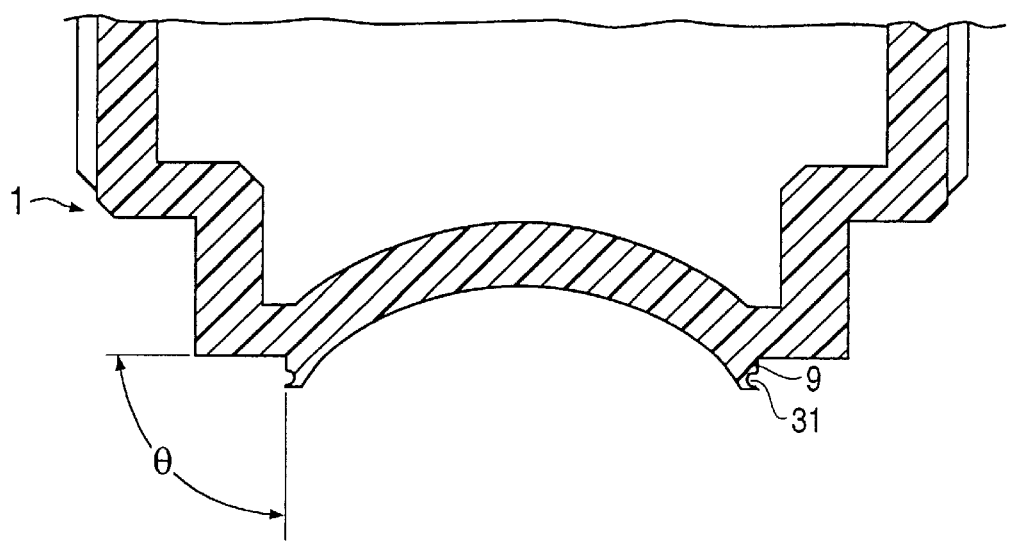
FIGS. 10–15 are sectional views of a two-sided lens mold according to other embodiments of the present invention.
Figure 12:
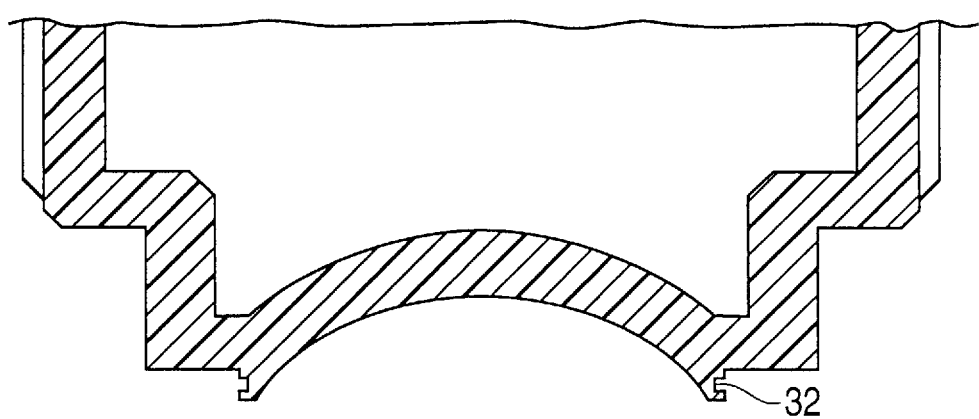

As shown in FIG. 10, the annular surface 9 may be provided such that $\Theta$ equals or nearly equals 90°. In the annular surface 9 is formed a round under cut 31. As the excess lens material polymerizes along the annular surface 9, such excess lens material will form within the round under cut 31 and will thus be mechanically engaged with the mold member 1. As shown in FIG. 12, a rectangular notch 32 may be provided in place of or in addition to the round under cut 31 shown in FIG. 10.

Figure 11:
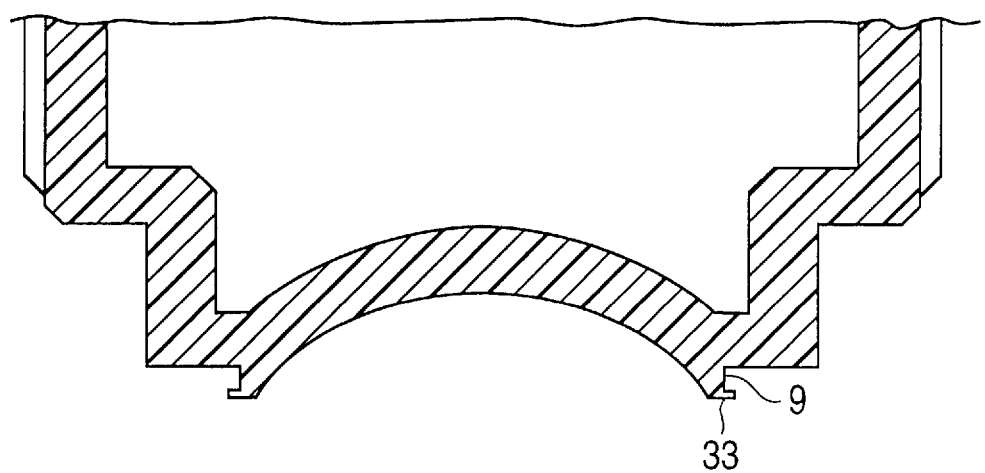

As shown in FIG. 11, the annular surface 9 is provided with an outwardly extending lip member 33 for engaging the ring of excess lens material. The lip member 33 may be formed at the lower edge of the annular surface 9 as shown, or the lip member 33 may be formed elsewhere along the annular surface 9.

Figure 13:
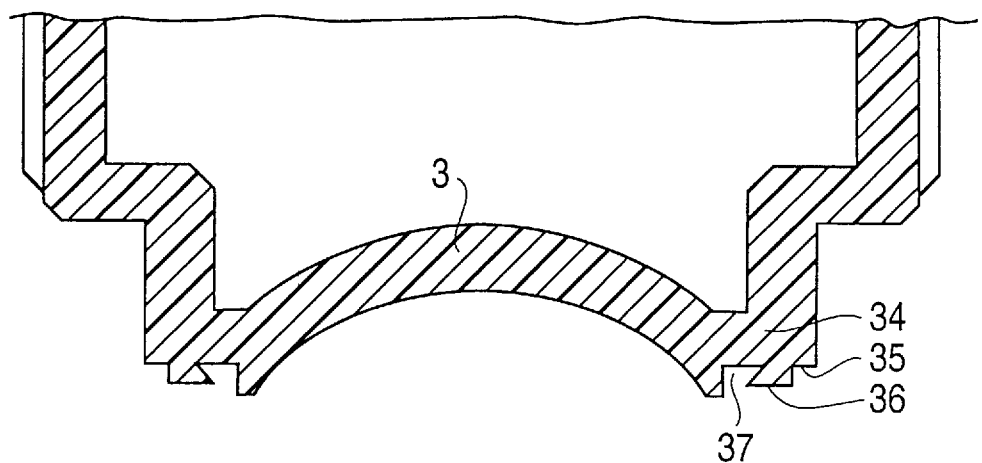

As shown in FIG. 13, the concave portion 3 is further defined by an outwardly extending annular member 34 having a lower surface 35. The lower surface 35 has formed thereon a ring engaging member 36. The ring engaging member 36 includes a portion extending inwardly and downwardly from the lower surface 35 to form an annular void 37 as shown. The excess lens material flows into the annular void 37 and, upon polymerization, is thereby mechanically engaged with the mold member 1.

Figure 14:
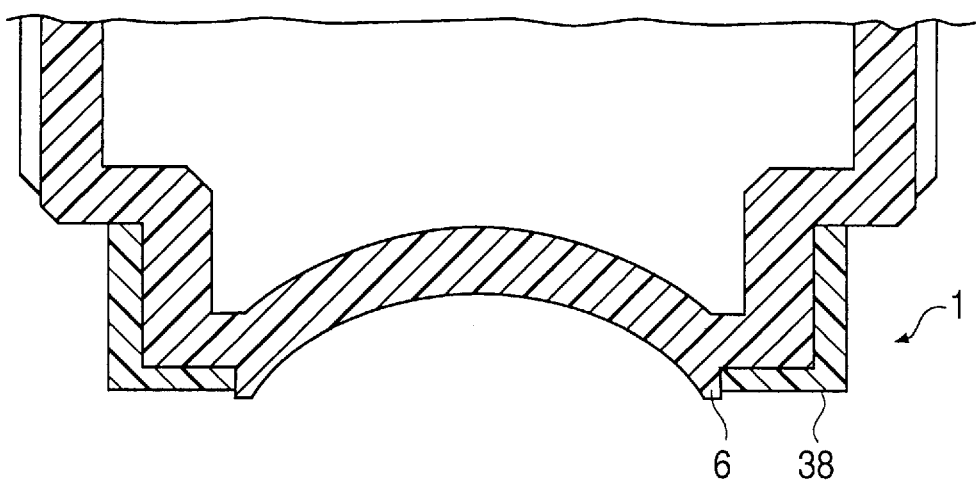

As shown in FIG. 14, non-mechanical locking arrangement is provided for engaging the excess lens material. Suppose again that the first mold member 1 is made of a relatively non-polar material and the second mold member (not shown) is made of a relatively polar material, thereby causing a cast lens to adhere to the relatively polar material of the second mold member. According to one embodiment of the present invention, a sleeve 38 is provided along the periphery of the outer rim 6 of the first mold member 1. By forming the sleeve of a relatively more polar material with respect to the relatively polar material of the second mold member, the ring of excess lens material will exhibit an affinity to adhere to the relatively more polar material of the sleeve 38.

Figure 15:
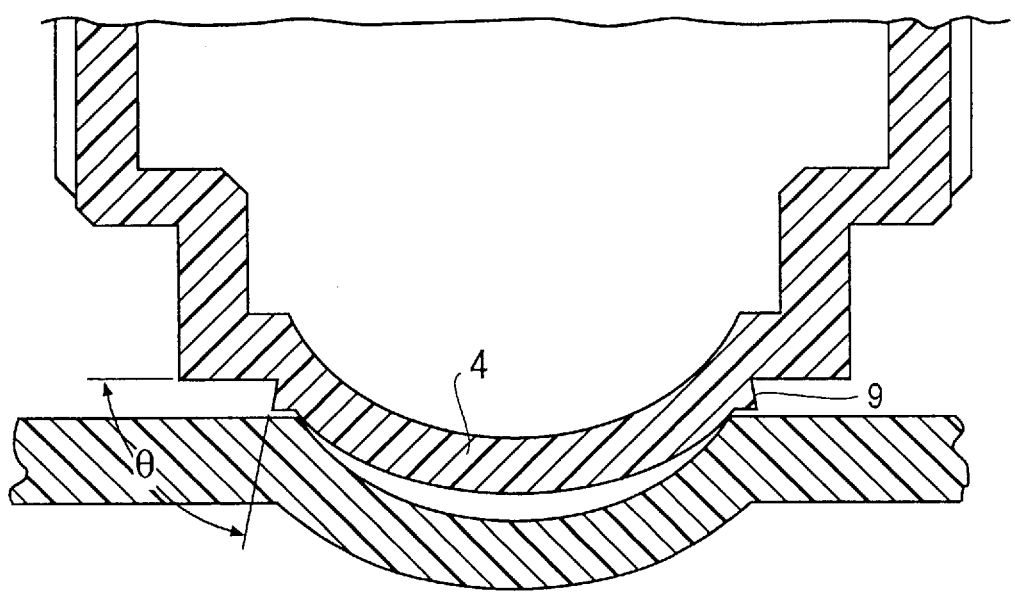

Although several embodiments of the ring engaging mechanism of the present invention have been herein described with reference to FIGS. 10–14, it is understood that those skilled in the art may contemplate other specific configurations without departing from the scope and spirit of the present invention. Moreover, although the embodiments discussed above illustrate the engagement of the ring of excess lens material to the concave portion of the mold, the ring of excess lens material may instead be directed to engage the convex side of the mold. For example, as shown in FIG. 15, the convex portion 4 may include the inwardly extending annular surface 9 of the embodiment shown in FIG. 8 for engaging the ring of excess lens material. Similarly, the other embodiments of the present invention may be applied to the convex portion of the mold.

4. Illumination Subsystem 400

The illumination subsystem 400 includes a light source for projecting collimated light through the mold system 300 containing a lens to be inspected to the camera and lens subsystem 200. Collimated white light has been found to be preferable to enhance the quality of the image obtained by the cameral lens subsystem 200. In the case of the present inventors, the illumination subsystem 400 was formed using a NIKON Model Number 83013 Diascopic Stand containing a halogen light source.

5. Overall System 500

As should be apparent from the above, the contact lens and molding inspection system 500 of the present invention functions as follows. The illumination subsystem 400 directs collimated white light through a mold member having a contact lens to be inspected resting thereon. For example, as shown in FIG. 5, a molded lens 7 rests upon the mold member 2 and light is transmitted therethrough to a lens and camera. An image of the lens 7 is obtained by the CCD array of a camera and converted into digital data denoting an image density of each pixel of the image. This data is processed by a computer subsystem 100 to detect abnormalities in the lens 7.

Figure 16:
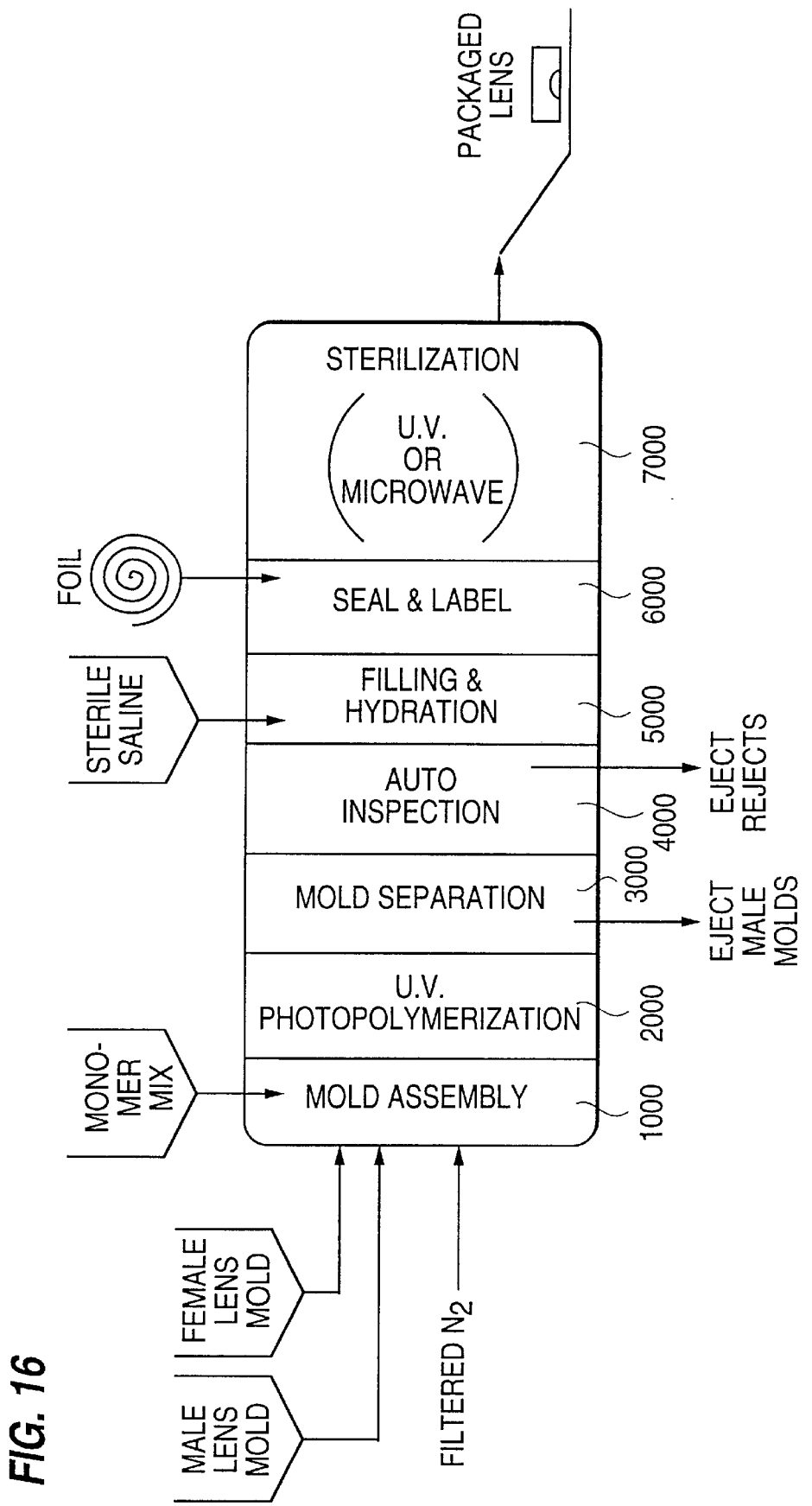
FIG. 16 is a diagram of an automatic production line according to the present invention.

The contact lens molding and inspection system 500 of the present invention may form an integral part of an entirely automated production line as shown in FIG. 16. In particular, the automated production line includes a mold assembly station 1000 wherein the opposing male and female lens molds are made to come together with a monomer or polymer lens material contained within a formed lens cavity. The molds containing the lens material are then conveyed to a UV photopolymerization station 2000 where the lens material is cured by way of ultraviolet radiation. After curing, one of the mold members, for example the female mold, is detached and ejected leaving the other mold member, for example the male mold member, with the lens resting thereon at a mold separation station 3000. It is noted that the excess ring of lens material is fixed to the ejected mold member. The mold member having the lens resting thereon is then conveyed to an auto inspection station 4000 which is essentially configured by the contact lens molding and inspection system 500 shown in FIG. 1. Also, at this station, any lens which is found to contain deformities is ejected. The filling and hydration station 5000 and the seal in label station 6000 are provided next for the purpose of packaging acceptable lenses. In particular, the mold containing the acceptable lens is filled with a saline solution, and then sealed using a foil. It is noted that the mold member itself forms the lens package. Finally, the package lenses are subject to treatment at a sterilization station 7000 and are then ready for delivery.

Thus, according to the present invention, a contact lens may be molded, inspected and prepared for final packaging without manual handling of the lens at any stage of the production process.

Figure 17A:
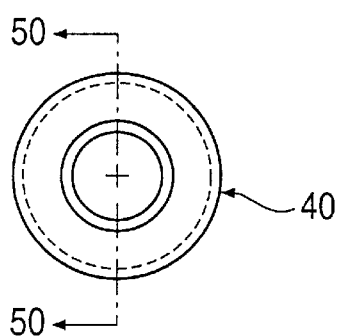
FIG. 17(a) is an end view of a vacuum pick-up tip.
Figure 17B:
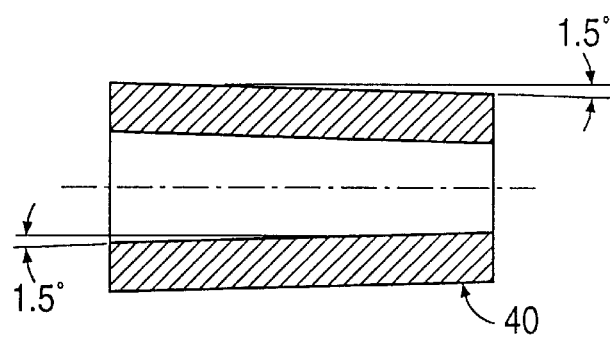
FIG. 17(b) is a cross-sectional view along the section line 50—50 of FIG. 17(a)
Figure 18:
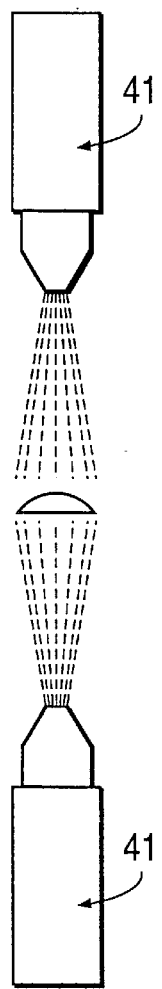
FIG. 18 is a view for explaining ionizing of a lens.

While the present invention has been described with reference to carrying out the automated inspection while the molded lens remains resting upon the mold member, it is noted that the inspection system can also be applied by removing the lens from the mold prior to the inspection and conveying the lens to a transparent or opaque support (or tray) for automated optical inspection. In such a case, it is necessary that steps be taken to maintain lens cleanliness from the time the lens is removed from the mold until after the lens has been inspected. For example, in order to remove the lens from the mold, a vacuum pick-up tip 40 may be used as shown in FIG. 17(*a*) and 17(*b*). It has been found that a polypropylene tip is preferable in that no characteristic "tip-marks" from the vacuum pack are formed on the lens and reliable release of the lens from the pick-up can be achieved when placing the lens on a viewing tray or the like. Additionally, in order to remove any debris adhering to the lens after removal from the mold due to static charge, as well as to neutralize the static charge on the lens, it is necessary to move the lens through an ionizing curtain of air as shown in FIG. 18. This process may also be necessary in the case where the lens remains on a mold surface. The air flow is to be impinging on the lens surfaces simultaneously from above and below using confronting ionizing nozzles 41. This allows the lens to remain stable on the vacuum pick-up tip 40 as it is passed through on its way to the inspection stage, while at the same time removing debris. It is important that the lens be inspected immediately after being passed through the anti-static curtain, so as to eliminate the chance for recontamination.

We claim:

1. A lens mold for use in a contact lens inspection system, said lens mold comprising a mold member formed of a transparent plastic material and having an outer surface opposite an inner surface, said inner surface being one of convex and concave and defining a lens cavity of said lens mold, said outer surface having an optical finish to permit optical inspection of a lens located on said inner surface by transmitting light through said mold member from said outer surface to said inner surface and through the lens located on said inner surface.

2. A lens mold as claimed in claim 1, wherein said outer surface is the other one of convex and concave, and wherein an outer periphery of said outer surface is located closer to a longitudinal axis of said mold member than is an outer periphery of said inner surface.

3. A lens mold comprising:
- a first mold member comprising a concave portion, said concave portion having a concave surface centered at a longitudinal axis of said first mold member, an outer rim located along a periphery of said concave surface, and ring engaging means disposed adjacent said outer rim for engaging, upon polymerization of a lens material within a lens cavity, excess lens material formed along an outer periphery of the lens cavity; and,
- a second mold member comprising a convex portion having a convex surface, wherein the lens cavity is defined between said concave and convex surfaces when said outer rim of said concave portion of said first mold member is made to contact said convex portion of said second mold member;
- whereby, upon polymerization of the lens material and upon a separation of said first and second mold members, the excess lens material is engaged with said first mold member; and
- wherein said second mold member is formed of a plastic material that is sufficiently transparent to permit light to transmit therethrough and to permit optical inspection of a lens located on said convex surface and comprises an outer surface opposite said convex surface, said outer surface having an optical finish to permit optical inspection of a lens located on said convex surface by transmitting light through said outer surface, said second mold member, said convex surface and the lens.

4. A lens mold as recited in claim 3, wherein said ring engaging means of said concave portion comprises an annular surface extending inwardly towards the longitudinal axis of said first mold member from said outer rim.

5. A lens mold as recited in claim 4, wherein said annular surface is frusto-conical.

6. A lens mold as recited in claim 3, wherein said ring engaging means of said concave portion comprises an annular surface extending substantially parallel to the longitudinal axis of the first mold member, and a notch formed in and along said annular surface.

7. A lens mold as recited in claim 6, wherein said notch defines a void within said annular surface having a rounded cross-section for receiving a portion of the excess lens material.

8. A lens mold as recited in claim 6, wherein said notch defines a void within said annular surface having a rectangular cross-section for receiving a portion of the excess lens material.

9. A lens mold as recited in claim 3, wherein said ring engaging means of said concave portion comprises an annular surface extending substantially parallel to the longitudinal axis of said first mold member, and a lip member extending outwardly from said annular surface.

10. A lens mold as recited in claim 3, wherein said ring engaging means of said concave portion comprises a first annular surface extending outwardly along the periphery of the lens cavity from the outer rim, and an annular member extending from said first annular surface, said annular member defining a second annular surface extending inwardly towards the longitudinal axis of said first mold member from said first annular surface, wherein an annular void for receiving the excess lens material is defined by said outer rim, said first annular surface and said second annular surface.

11. A lens mold as recited in claim 3, wherein said ring engaging means of said concave portion comprises an annular member made of a first plastic material disposed along a periphery of said outer rim, and wherein said second mold member is made of a second plastic material, and wherein said first plastic material is more polar relative to said second plastic material, whereby the excess lens material will exhibit an affinity to adhere to said annular member upon the separation of said first and second mold members.

12. A lens mold as recited in claim 11, wherein said first mold member at said concave surface is made of a third plastic material, and wherein said second plastic material is more polar relative to said third plastic material, whereby a polymerized lens within the lens cavity will exhibit an affinity to adhere to said convex surface upon the separation of said first and second mold members.

13. A lens mold comprising:
- a first mold member comprising a convex portion, said convex portion having a convex surface centered at a longitudinal axis of said first mold member, an outer rim located along a periphery of said convex surface, and ring engaging means disposed adjacent said outer rim for engaging, upon polymerization of a lens material within a lens cavity, excess lens material formed along an outer periphery of the lens cavity; and,
- a second mold member comprising a concave portion having a concave surface, wherein the lens cavity is defined between said convex and concave surfaces when said outer rim of said convex portion of said first mold member is made to contact said concave portion of said second mold member;
- whereby, upon polymerization of the lens material and upon a separation of said first and second mold members, the excess lens material is engaged with said first mold member; and
- wherein said second mold member is formed of a transparent plastic material that is sufficiently transparent to permit light to transmit therethrough and to permit optical inspection of a lens located on said convex surface and comprises an outer surface opposite said concave surface, said outer surface having an optical finish to permit optical inspection of a lens located on said concave surface by transmitting light through said outer surface, said second mold member, said concave surface and the lens.

14. A lens mold as recited in claim 13, wherein said ring engaging means of said convex portion comprises an annular surface extending inwardly towards the longitudinal axis of said first mold member from said outer rim.

15. A lens mold as recited in claim 14, wherein said annular surface is frusto-conical.

16. A lens mold as recited in claim 13, wherein said ring engaging means of said convex portion comprises an annular surface extending substantially parallel to the longitudinal axis of the first mold member, and a notch formed in and along said annular surface.

17. A lens mold as recited in claim 16, wherein said notch defines a void within said annular surface having a rounded cross-section for receiving a portion of the excess lens material.

18. A lens mold as recited in claim 16, wherein said notch defines a void within said annular surface having a rectangular cross-section for receiving a portion of the excess lens material.

19. A lens mold as recited in claim 13, wherein said ring engaging means of said convex portion comprises an annular surface extending substantially parallel to the longitudinal axis of said first mold member, and a lip member extending outwardly from said annular surface.

20. A lens mold as recited in claim 13, wherein said ring engaging means of said convex portion comprises a first annular surface extending outwardly along the periphery of the lens cavity from the outer rim, and an annular member extending from said first annular surface, said annular member defining a second annular surface extending inwardly towards the longitudinal axis of said first mold member from said first annular surface, wherein an annular void for receiving the excess lens material is defined by said outer rim, said first annular surface and said second annular surface.

21. A lens mold as recited in claim 13, wherein said ring engaging means of said convex portion comprises an annular member made of a first plastic material disposed along a periphery of said outer rim, and wherein said second mold member is made of a second plastic material, and wherein said first plastic material is more polar relative to said second plastic material, whereby the excess lens material will exhibit an affinity to adhere to said annular members.

22. A lens mold as recited in claim 21, wherein said first mold member at said convex surface is made of a third plastic material, and wherein said second plastic material is more polar relative to said third plastic material, whereby a polymerized lens within the lens cavity will exhibit an affinity to adhere to said concave surface upon the separation of said first and second mold members.

* * * * *